US011607696B2

United States Patent
Smolko-Schvarzmayr et al.

(10) Patent No.: US 11,607,696 B2
(45) Date of Patent: Mar. 21, 2023

(54) PROCESS TO TREAT PHOSPHATE ORES

(71) Applicant: Akzo Nobel Chemicals International B.V., Arnhem (NL)

(72) Inventors: Natalija Smolko-Schvarzmayr, Hjälteby (SE); Göran Thomas Ljungdahl, Öjersjö (SE); Johan Ekeroth, Kungälv (SE); Åsa Hele'n Jeanette Kleberger Hellström, Ljungskile (SE); Emelie Svensson, Västra Frölunda (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 877 days.

(21) Appl. No.: 16/468,533

(22) PCT Filed: Dec. 18, 2017

(86) PCT No.: PCT/EP2017/083203
§ 371 (c)(1),
(2) Date: Jun. 11, 2019

(87) PCT Pub. No.: WO2018/114741
PCT Pub. Date: Jun. 28, 2018

(65) Prior Publication Data
US 2020/0222914 A1     Jul. 16, 2020

(30) Foreign Application Priority Data
Dec. 23, 2016   (EP) ..................................... 16206716

(51) Int. Cl.
*B03D 1/00*     (2006.01)
*B03D 1/01*     (2006.01)
(Continued)

(52) U.S. Cl.
CPC .......... *B03D 1/008* (2013.01); *B01D 21/0084* (2013.01); *B03D 1/016* (2013.01); *C01B 25/01* (2013.01); *B03D 2201/02* (2013.01)

(58) Field of Classification Search
CPC .... B03D 1/008; B03D 1/016; B03D 2201/02; B03D 1/01; B03D 1/012; B03D 1/014;
(Continued)

(56) References Cited

U.S. PATENT DOCUMENTS 2,259,420 A * 10/1941 Hills .................... B03D 1/02
106/219
2,302,338 A * 11/1942 Moeller ................ B03D 1/008
252/61

(Continued)

FOREIGN PATENT DOCUMENTS

CN     1047887 A     12/1990
CN     1902359 A     1/2007
(Continued)

OTHER PUBLICATIONS

Russian Patent Office, Russian Office Action issued in RU Application No. 2019122168, dated Dec. 4, 2019.
(Continued)

*Primary Examiner* — Joseph W Drodge
(74) *Attorney, Agent, or Firm* — Lorenz & Kopf, LLP

(57) ABSTRACT

The present invention relates to a process for treating non-sulfidic ores with a collector composition containing a primary and a secondary collector, wherein the primary collector is selected from the group of amphoteric and anionic surface active compounds and the secondary collector is an ethoxylated fatty acid wherein the average degree of ethoxylation is higher than 0 and less than 2, to collector compositions suitable for use in the above process, and to pulp comprising such collector compositions.

20 Claims, 1 Drawing Sheet

(51) Int. Cl.
*C01B 25/01* (2006.01)
*B01D 21/00* (2006.01)
*B03D 1/008* (2006.01)
*B03D 1/016* (2006.01)

(58) Field of Classification Search
CPC ...... B03D 1/02; B03D 1/021; B03D 2203/04; B03D 2203/06; C02F 1/24; B01D 21/0084; C01B 25/01; C01B 25/234; C01B 25/235; C01B 25/30; C01B 25/32; C01B 25/45
See application file for complete search history.

(56) References Cited

U.S. PATENT DOCUMENTS

| | | | |
|---|---|---|---|
| 2,312,466 A * | 3/1943 | Erickson | B03D 1/008 209/49 |
| 3,623,605 A * | 11/1971 | Perri | B03D 1/008 209/166 |
| 4,192,737 A | 3/1980 | Thompson et al. | |
| 4,358,368 A * | 11/1982 | Hellsten | B03D 1/0043 252/61 |
| 4,430,238 A | 2/1984 | Hellsten et al. | |
| 4,514,290 A | 4/1985 | Swiatkowski et al. | |
| 4,790,932 A * | 12/1988 | Kottwitz | B03D 1/012 252/61 |
| 4,929,274 A | 5/1990 | Luttinger | |
| 4,968,415 A | 11/1990 | Morawietz et al. | |
| 5,441,156 A * | 8/1995 | Fabry | B03D 1/012 241/20 |
| 5,718,801 A * | 2/1998 | Li | D21C 5/027 162/DIG. 3 |
| 6,780,824 B2 | 8/2004 | Oelscher et al. | |
| 7,169,257 B2 | 1/2007 | Rosencrance et al. | |
| 7,393,462 B2 | 7/2008 | Gorken et al. | |
| 7,624,878 B2 | 12/2009 | Tran et al. | |
| 8,387,801 B2 | 3/2013 | Gustafsson | |
| 8,875,898 B2 | 11/2014 | Hines et al. | |
| 2013/0092603 A1* | 4/2013 | Nagaraj | B03D 1/014 252/61 |
| 2014/0251920 A1* | 9/2014 | Man | B03D 1/24 210/705 |
| 2015/0273481 A1 | 10/2015 | Dilsky et al. | |
| 2017/0252753 A1* | 9/2017 | Smolko-Schvarzmayr | B03D 1/01 |

FOREIGN PATENT DOCUMENTS

| | | |
|---|---|---|
| CN | 1954038 A | 4/2007 |
| CN | 101384370 A | 3/2009 |
| CN | 101678366 A | 3/2010 |
| CN | 103464295 A | 12/2013 |
| CN | 104307640 A | 1/2015 |
| CN | 104324814 A | 2/2015 |
| CN | 104520009 A | 4/2015 |
| EP | 2 708 282 A1 | 3/2014 |
| GB | 2 098 194 A | 11/1982 |
| RU | 2 207 915 C2 | 7/2003 |
| RU | 2255813 A | 3/2005 |
| SU | 143745 | 11/1961 |
| SU | 190831 | 3/1967 |
| WO | 2015/000931 A2 | 1/2015 |
| WO | 2016/041916 A1 | 3/2016 |
| WO | 2016/155966 A1 | 10/2016 |

OTHER PUBLICATIONS

European Search Report issued in the counterpart European Application No. 16206716.9 dated Jun. 9, 2017.
Notification of Transmittal of the International Search Report and the Written Opinion of the International Searching Authority, or the Declaration from the International Bureau of WIPO for International Application No. PCT/EP2017/080203 dated May 11, 2018.
Machine Translation of SU1833408, Aug. 7, 1993.
Machine Translation of RU2014150, Jun. 15, 1994.
Hossain et al., "Condensed structure formation in mixed monolayers of anionic surfactants and 2-hydroxyethyl laurate at the air-water interface," Colloids and Surfaces, A: Physiochemical and Engineering Aspects, vol. 205, No. 3, Jun. 1, 2002, pp. 249-260, Amsterdam, NL, ISSN: 0927-7757, XP055377579.
Hossain et al, "Phase transition in Gibbs monolayers of mixed surfactants" In: "Studies in Surface Science and Catalysis," Jan. 1, 2001, Elsevier BV, NL, ISSN: 0167-2991, vol. 132, pp. 169-172, XP055377581.
Stockburger et al., "The Reaction of Ethylene Oxide with Oleic Acid," The Journal of the American Oil Chemists' Society, vol. 43, Jan. 1, 1966, pp. 6-10, XP055471801.
Ivanova, Flotation properties of polyglycerol ester, Fiz-Khim Osn (1972), 25-31 with English Abstract.
Peres A.E.C. et al., "Plant Practice: Nonsulfide Minerals", Froth Flotation, A Century of Innovation, 2007, Society for Mining, Metallurgy, and Exploration, Inc.

\* cited by examiner

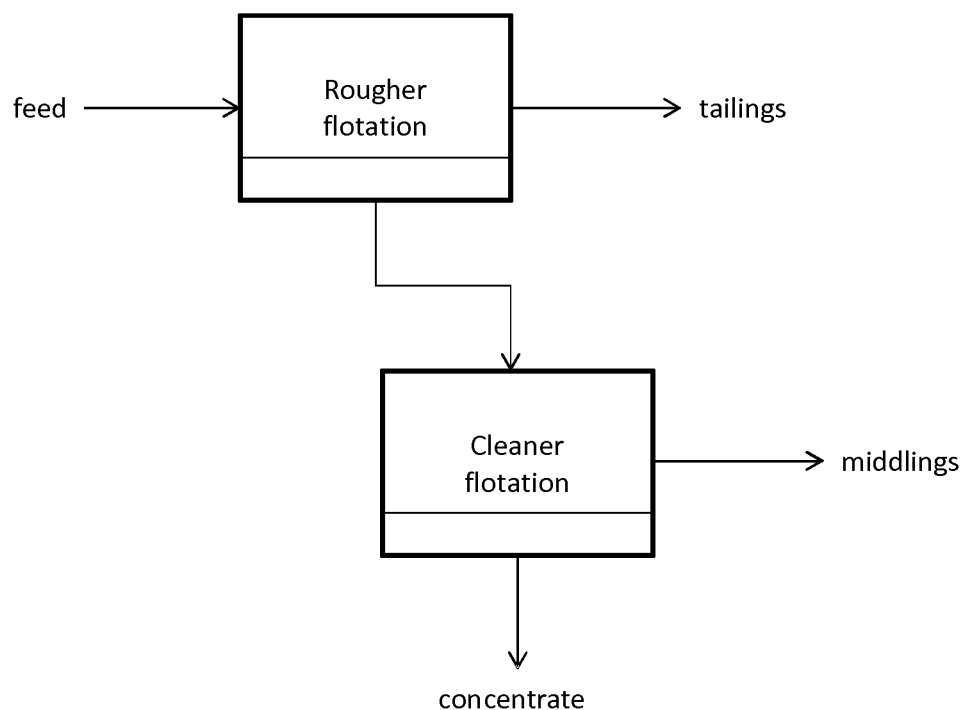

PROCESS TO TREAT PHOSPHATE ORES

This application is a national stage filing under 35 U.S.C. § 371 of PCT/EP2017/083203, filed Dec. 18, 2017, which claims priority to European Patent Application No. 16206716.9, filed Dec. 23, 2016, the contents of which are each incorporated herein by reference in their entireties.

The present invention relates to a process to treat non-sulfidic ores, such as phosphate ores, with a collector composition containing a fatty acid ethoxylate having a very low average degree of ethoxylation as a secondary collector in combination with a primary collector that is anionic or amphoteric.

Froth flotation is a physico-chemical process used to separate mineral particles considered economically valuable from those considered waste. It is based on the ability of air bubbles to selectively attach to those particles previously rendered hydrophobic. The particle-bubble combinations then rise to the froth phase from where the flotation cell is discharged whilst the hydrophilic particles remain in the flotation cell. Particle hydrophobicity, in turn, is induced by special chemicals called collectors. In direct flotation systems, it is the economically valuable minerals which are rendered hydrophobic by the action of the collector. Similarly, in reverse flotation systems, the collector renders hydrophobicity to those mineral particles considered waste. The efficiency of the separation process is quantified in terms of recovery and grade. Recovery refers to the percentage of valuable product contained in the ore that is removed into the concentrate stream after flotation. Grade refers to the percentage of the economically valuable product in the concentrate after flotation. A higher value of recovery or grade indicates a more efficient flotation system. Selectivity of the collector refers to the ability of the collector to selectively adsorb onto the surface of the targeted mineral only. Improved selectivity is directly proportional to improved performance (recovery, grade) and usually is expressed as a "selectivity factor".

The most widely used anionic flotation agents for flotation of phosphate ores are unsaturated fatty acids, for example, oleic acid, and the technical grades or commercial grades of naturally occurring fatty acid mixtures having a high proportion of unsaturated fatty acids, such as tall oil, soybean oil, cottonseed oil and linseed oil and derivatives thereof, as well as synthetic acids. The unsaturated fatty acid flotation agents are known to be comparatively non-selective because they are also suitable for the flotation of silicate-containing and carbonate-containing minerals and therefore have only limited use in cases where the accompanying minerals such as these have to be separated from other valuable minerals.

A lot of suitable anionic surfactants have been proposed for use as flotation agents for calcium phosphate, such as, for example, fatty acids, alkyl benzene sulfonates, alkyl phosphates, alkyl sulfates, alkyl sulfosuccinamates, alkyl sulfosuccinates, alkyl lactylates, alkyl hydroxamates, N-acyl neutral amino acid (alkylamido carboxylic acid), like N-acyl derivatives of sarcosine or N-acyl derivatives of glycine. It is also known that these types of surfactants usually cannot be used in a pure form since they do not provide the right froth characteristics during flotations; therefore, anionic surfactants are usually used in formulations together with other anionic surfactants (especially of the fatty acid type) or nonionic surfactants. This is disclosed for example in EP2708282A1, where a fatty acid collector is combined with a sarcosinate co-collector.

Amphoteric surfactants are also mentioned as flotation agents for phosphate ores. They are disclosed for example in U.S. Pat. No. 4,358,368 and include compounds like

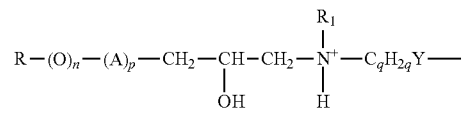

wherein R is a hydrocarbon group having from 7 to 24 carbon atoms and preferably from 10 to 18 carbon atoms; A is an oxyalkylene group having from 2 to 4 carbon atoms; R1 is selected from the group consisting of hydrogen and hydrocarbon groups having from 1 to 4 carbon atoms; $Y^-$ is selected from the group consisting of $COO^-$ and $SO3^-$; n is a number from 0 to 1; p is a number from 0 to about 5; and q is a number from 1 to 2.

SU 143745 discloses a flotation process for phosphate ores, such as apatite ores, wherein carboxylic acids or their soaps are added to compounds of the formula R—CO(OCH$_2$—CH)$_n$OH, wherein n is 2-10.

CN 104307640 discloses a collecting agent for phosphate rock containing fatty acid polyoxyethylene ester with preferably 3 to 5 equivalents of ethylene oxide in combination with fatty alcohol ethoxylate and fatty alcohol ethoxylate phosphate. The fatty alcohol ethoxylate phosphate is an anionic collector for phosphate but one that is not much preferred.

U.S. Pat. No. 2,302,338 discloses floating agents for oxidic and sulphidic ores such as apatite containing an alkoxylated emulsifying agent. Though in general the document says that the number of alkoxylate (ethoxylate) groups can be 2 or more, in the example an oleic acid, i.e. an anionic primary collector, and hydroxyethoxylated castor oil with 40 ethoxylate units, which can be considered the secondary collector are used for treating a fluorspar ore.

There is a need in the art to improve selectivity.

BRIEF DESCRIPTION OF THE DRAWING

The present disclosure will hereinafter be described in conjunction with the following drawing figure, wherein:

FIG. 1 is a schematic representation of the flotation steps that are performed and the different fractions collected as described relative to Example 1 and Comparative Examples 2 and 3 and also relative to Example 4 and Comparative Examples 5.

Surprisingly, it was found that using a fatty acid ethoxylate with a low degree of ethoxylation in a combination with one or more primary anionic or amphoteric collectors improves the selectivity of the already selective primary collectors in a process to treat non-sulfidic ores.

In a preferred process a fatty acid ethoxylate was found to provide improved selectivity when used in the flotation of phosphate ores, such as more preferably apatite ores.

The present invention now provides a process for treating non-sulfidic ores with a collector composition containing a primary and a secondary collector, wherein the primary collector is selected from the group of amphoteric and anionic surface-active compounds and the secondary collector is an ethoxylated fatty acid wherein the average degree of ethoxylation is higher than 0 and less than 2.

It may be noted that U.S. Pat. No. 2,312,466 discloses a flotation process for phosphate rocks wherein glycol oleate (i.e. monoethoxylated oleic acid) is used but combined with pine tar oil and fuel oil, neither of which can be considered anionic or amphoteric surfactants.

It may furthermore be noted that U.S. Pat. No. 2,259,420 discloses a flotation process and reagents for use therein to separate minerals, particularly for the oxidized ores of manganese. The flotation process disclosed involves the use of (talloel) tall oil as a flotation reagent. The document indicates that it is beneficial to make an aqueous composition in which the tall oil is emulsified using a small amount (0.25 to 2% on total tall oil amount) of emulsifying agent. Ethylene glycol oleate is mentioned as one choice from a group of compounds that can be used as an emulsifying agent. There is no disclosure or suggestion that an emulsifying agent would also function as a secondary collector in U.S. '420, especially because the amounts in which emulsifying agents and secondary collectors are used are different in the sense that secondary collectors are commonly used in higher amounts than the emulsifying agent is used in U.S. '420. Also in U.S. '420 no ores are treated with a composition that contains, besides the tall oil, an ethylene glycol based emulsifying agent. The one example wherein an emulsifying agent is used, 1% of propylene glycol oleate on tall oil amount is employed as this emulsifying agent. Finally, in U.S. '420 manganese ore treatments are disclosed only for ores in which the amount of manganese is higher than 10 wt % on total ore weight.

The invention furthermore provides a collector composition suitable for use in the above process containing between 1 and 60 wt % of secondary collector and between 40 and 99 wt % of primary collector, the wt % being based on total collector components, wherein the primary collector is selected from the group of amphoteric and anionic surface-active compounds and the secondary collector is an ethoxylated fatty acid wherein the average degree of ethoxylation is higher than 0 and less than 2, and a pulp comprising the crushed and ground non-sulfidic ore and a collector composition as described herein.

In preferred embodiments the ethoxylated fatty acid in the collector composition is of the formula R—C(O)—O-(EO)n (I), wherein R is an alkyl or alkenyl group having 7 to 23 carbon atoms and EO is an ethyleneoxy unit; n is a number higher than 0.5 and up to 2.

In a more preferred embodiment R is a hydrocarbyl group having 11 to 21 carbon atoms, can be linear or branched, contain 0 to 4 double bonds and may be substituted with up to 3 hydroxyl substituents. Even more preferably, R is a fatty acid-derived hydrocarbyl group with 15 to 18 carbon atoms containing 0, 1 or 2 double bonds. Most preferably, R is the hydrocarbyl group derived from a fatty acid from the group of soybean fatty acid, cottonseed fatty acid, linseed fatty acid, oleic acid, linoleic acid, ricinoleic acid, and tall oil fatty acid. It should be noted that it is possible to use mixtures of different ethoxylated fatty acids obtainable by ethoxylating a mixture of fatty acids with up to 2, preferably 0.5 to 2, equivalents of ethylene oxide.

In another preferred embodiment the collector composition contains between 3 and 50 wt % of secondary collector(s) and between 50 and 97 wt % of primary collector(s), even more preferably between 5 and 40 wt % of secondary collector(s) and between 60 and 95 wt % of primary collector(s), most preferably between 70 and 90 wt % of primary collector(s) and between 10 and 30 wt % of secondary collector(s), wherein the primary collector comprises a collector selected from the group of amphoteric and anionic surface-active compounds, and combinations of two or more of these, and the secondary collector comprises one or more ethoxylated fatty acids wherein the average degree of ethoxylation is higher than 0 and less than 2, and the wt % is based on total collector weight.

In preferred embodiments the primary collector comprises an anionic surfactant selected from the group of fatty acids, alkyl benzene sulfonates, alkyl phosphates, alkyl sulfates, alkyl sulfosuccinamates, alkyl sulfosuccinates, alkyl lactylates, alkyl hydroxamates, N-acyl neutral amino acid (alkylamido carboxylic acid), like N-acyl derivatives of sarcosine or N-acyl derivatives of glycine, or an amphoteric surfactant of the following formula

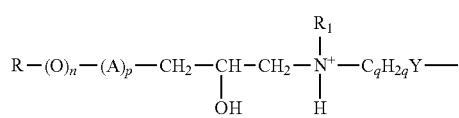

wherein R is a hydrocarbon group having from 7 to 24 carbon atoms, and preferably from 10 to 18 carbon atoms; A is an oxyalkylene group having from 2 to 4 carbon atoms; R1 is selected from the group consisting of hydrogen and hydrocarbon groups having from 1 to 4 carbon atoms; Y⁻ is selected from the group consisting of COO⁻ and SO3⁻; n is a number from 0 to 1; p is a number from 0 to about 5; and q is a number from 1 to 2.

In even more preferred embodiments the primary collector comprises one or more anionic surfactants selected from the group of fatty acids, alkyl benzene sulfonates, alkyl phosphates, alkyl sulfates, alkyl sulfosuccinamates, alkyl sulfosuccinates, alkyl lactylates, alkyl hydroxamates, N-acyl neutral amino acid (alkylamido carboxylic acid), like N-acyl derivatives of sarcosine or N-acyl derivatives of glycine, and is substantially free of amphoteric surfactants, i.e. contains less than 5 wt % on total primary collector weight of amphoteric surfactants, yet more preferably less than 1 wt %. Most preferably, anionic surfactants are selected from the group of fatty acids, alkyl lactylates, and the N-acyl derivatives of sarcosine and glycine.

In preferred processes or pulp according to the invention the ore is a non-metallic ore, more preferably it is a phosphate ore. In an even more preferred process or pulp the ore is apatite ore. A non-metallic ore is an ore in which less than 5 wt % of metallic components are present on total ore weight, preferably less than 1 wt % on total ore weight, even more preferably less than 0.3 wt %

In other preferred processes or pulp according to the invention the ore is a metallic ore, more preferably it is a metallic phosphate ore, such as even more preferably an iron-containing phosphate ore, titanium-containing phosphate ore, or alkaline earth metal-containing phosphate ore (the alkaline earth metal being e.g. magnesium or barium), most preferably an apatite-containing iron ore.

In further preferred processes or pulp the ore contains less than 10 wt % of manganese, more preferably less than 5 wt % of manganese, yet more preferably less than 1 wt % of manganese, most preferably less than 0.3 wt % of manganese, on total ore weight.

In other preferred embodiments the process is a direct flotation process of the ore, more preferably a direct flotation process of phosphate ore, such as apatite (which includes for example the reverse flotation of iron ores wherein apatite is floated).

More specifically in yet another preferred embodiment the process comprises the following steps:

a) conditioning a pulped ore, wherein the ore comprises a non-sulfidic mineral, such as phosphate, and optionally a flotation bath adjunct, in an aqueous solution b) adding the collector composition as described above b) optionally adding another flotation bath adjunct or a depressant to the pulp, and c) performing a froth flotation process to recover the mineral.

Depressants can suitably be biopolymers, such as celluloses or starches, or they can be silicates. The celluloses or starches and silicates can be used as such or modified, as is known to the person skilled in the art.

Flotation bath adjuncts that are of use in the process of the invention include pH-regulators, frothers, and activators. For example, nonionic surfactants can be added to contribute to the activity of the primary collector and to the regulation of the froth evolution.

Compounds suitable as secondary collector in accordance with the present invention may be obtained by the addition of alkylene oxide to a carboxylic acid. The value of n in the above formula (I), also referred to as the average degree of ethoxylation in this document, does not represent a pure compound which always has the same amount of EO groups to the fatty acid but indicates that the fatty acid ethoxylate has been obtained by reacting the fatty acid with n molar equivalents of ethylene glycol, giving a product mixture wherein the average EO degree is n. Consequently, n does not have to be an integer.

This reaction is well-known to those skilled in the art and usually results in some by-products. Typical by-product can be unreacted carboxylic acid, dialkyl carboxylic acid ethylene glycol ester, carboxylic acid soap and ethylene glycol. Usually by-products do not affect the process of flotation, but they can contribute to the flotation or appearance of the product-formulation in a positive way. For example, the unreacted carboxylic acid and carboxylic acid soap can perform as a primary anionic collector; dialkyl carboxylic acid ethylene glycol ester and ethylene glycol can perform as solvents.

EXAMPLE 1 AND COMPARATIVE EXAMPLES 2 AND 3

A phosphate ore containing 25-30% of apatite, 24-28% of silicates and ca 20% of iron oxides was crushed and ground to a desirable flotation size (K80=180 μm). 500 g of the ore was placed into a 1.4 L Denver flotation cell, 500 ml of tap water (Stenungsund municipal water with hardness 4° dH) was added and the mixing started. Then 5 minutes conditioning with 25 ml of a 1 wt % aqueous starch solution was performed, the collector was added as a 1 wt % solution, and conditioning was continued for 2.5 minutes.

In Example 1 according to the invention the primary collector is an alkyl amido sarcosinate compound ex Croda sold under the tradename Crodacinic™ 0 combined with tall oil fatty acid (TOFA), and an ethoxylated tall oil fatty acid obtained by ethoxylating tall oil fatty acid with 1 molar equivalent of ethylene oxide is added as secondary collector. In Examples 2 and 3, which are comparative, the collector composition instead of tall oil contains fatty acid ethoxylated with 1 molar equivalent of ethylene oxide, the same tall oil fatty acid ethoxylated with 10 equivalents of ethylene oxide as a secondary collector, or no secondary collector. The compositions are summarized in Table 1 below.

TABLE 1

Composition of collector mixtures used in the flotations

Amount of flotation aids in the collector mixture, weight %

| | TOFA | Crodacinic O | TOFA + 1EO | TOFA + 10EO |
|---|---|---|---|---|
| Example 1 | 40 | 40 | 20 | |
| Comparative Example 2 | 40 | 40 | | 20 |
| Comparative Example 3 | 50 | 50 | | |

After the conditioning steps tap water was added, so that a total volume of 1.4 L was obtained, the pH of the flotation mixture was adjusted to 9.5 with a 5% NaOH aqueous solution, and the flotation was started. The experiment was performed at RT (20±1° C.). The rougher flotation, followed by one cleaning step, was performed. All fractions (tailings, middlings and concentrate) were collected and analyzed. The results are summarized in Tables 2 and 3 below. In FIG. 1 the flotation steps performed and the different fractions collected are illustrated schematically.

Results

TABLE 2

Flotation results presented as $P_2O_5$ recovery and grade.

| Collector composition | Fraction | Amount of phosphate as $P_2O_5$ | |
|---|---|---|---|
| | | grade, % | recovery, % |
| Example 1 | Rougher tailings | 26.62 | 90.4 |
| | Middlings | 31.69 | 84.7 |
| | concentrate | 34.29 | 78.4 |
| Comparative Example 2 | Rougher tailings | 27.54 | 88.8 |
| | Middlings | 32.57 | 82.7 |
| | concentrate | 34.92 | 75.1 |
| Comparative Example 3 | Rougher tailings | 24.84 | 91.2 |
| | Middlings | 29.48 | 86.6 |
| | concentrate | 32.15 | 81.7 |

TABLE 3

| Collector composition | selectivity factor at grade | |
|---|---|---|
| | Selectivity factor at grade | |
| | 27.6% of $P_2O_5$ | 29.8% $P_2O_5$ |
| Example 1 | 4.9 | 3.2 |
| Comparative Example 2 | 4.5 | 3.2 |
| Comparative Example 3 | 4.0 | 2.2 |

The selectivity factor is calculated according to the following equation:

$$\text{Selectivity factor} = \frac{\text{reduction of waste (\%)}}{100 - \text{recovery of apatite (\%)}},$$

Where $$\text{Reduction of waste (\%)} = \frac{\text{waste in fraction (\%)}}{\text{waste in the feed (\%)}} * 100$$

The selectivity factor should be as high as possible, which is clearly the case for Example 1 according to the present invention over the scope of several P₂O₅ grades. Accordingly, using a fatty acid having a low degree of ethoxylation in line with the present invention as a secondary collector proves advantageous for the selectivity in a phosphate flotation process compared to using a secondary collector that has a higher degree of ethoxylation or no secondary collector.

Example 4 and Comparative Examples 5

A phosphate ore containing 25-30% of apatite, 24-28% of silicates and ca 20% of iron oxides was crushed and ground to a desirable flotation size (K80=180 μm). 500 g of the ore was placed into a 1.4 L Denver flotation cell, 500 ml of tap water (Stenungsund municipal water with hardness 4° dH) was added and the mixing started. Then 5 minutes conditioning with 25 ml of a 1 wt % aqueous starch solution was performed, the collector was added as a 1 wt % solution, and conditioning was continued for 2.5 minutes.

In Example 4 according to the invention the primary collector is an alkyl amido glycinate compound prepared according to WO2015/000931 combined with tall oil fatty acid (TOFA), and an ethoxylated tall oil fatty acid obtained by ethoxylating tall oil fatty acid with 1 molar equivalent of ethylene oxide is added as secondary collector. In Example 5 which is comparative, the collector composition contains no secondary collector. The compositions are summarized in Table 4 below.

TABLE 4

Composition of collector mixtures used in the flotations

| | Amount of flotation aids in the collector mixture, weight % | | |
|---|---|---|---|
| | TOFA | alkyl amido glycinate | TOFA + 1EO |
| Example 4 | 40 | 40 | 20 |
| Comparative Example 5 | 50 | 50 | |

After the conditioning steps tap water was added so that a total volume of 1.4 L was obtained, the pH of the flotation mixture was adjusted to 9.5 with a 5% NaOH aqueous solution, and the flotation was started. The experiment was performed at RT (20±1° C.). The rougher flotation, followed by one cleaning step, was performed. All fractions (tailings, middlings and concentrate) were collected and analyzed. The results are summarized in Tables 5 and 6 below. In FIG. 1 the flotation steps performed and the different fractions collected are illustrated schematically.

Results

TABLE 5

Flotation results presented as P₂O₅ recovery and grade.

| Collector composition | Fraction | Amount of phosphate as P₂O₅ | | Recovery at grade 33% of P2O5, % |
|---|---|---|---|---|
| | | grade, % | recovery, % | |
| Example 4 | Rougher tailings | 26.68 | 92.5 | 80 |
| | Middlings | 31.97 | 84.7 | |
| | concentrate | 34.59 | 73.3 | |
| Comparative Example 5 | Rougher tailings | 26.04 | 92.9 | 78 |
| | Middlings | 31.13 | 86.3 | |
| | concentrate | 33.5 | 77 | |

TABLE 6 selectivity factor at grade

| Collector composition | Selectivity factor at grade 31% of P2O5 |
|---|---|
| Example 4 | 2.5 |
| Comparative Example 5 | 2.0 |

What is claimed is:

1. A process comprising the step of treating non-sulfidic ores with a collector composition, wherein the collector composition comprises from 3 to 60 wt % of a secondary collector and from 40 to 97 wt % of at least one primary collector, the wt % being based on a total weight of the primary and secondary collectors, wherein the primary collector is selected from the group of amphoteric and anionic surface-active compounds and the secondary collector is an ethoxylated fatty acid having an average degree of ethoxylation of greater than 0 and less than 2.

2. The process of claim 1, wherein the ethoxylated fatty acid is of the formula $$R-C(O)-O-(EO)n \qquad (I),$$

wherein R is an alkyl or alkenyl group having 7 to 23 carbon atoms; EO is an ethyleneoxy unit; and n is a number greater than 0.5 and less than 2.

3. The process of claim 2, wherein R is a hydrocarbyl group having 11 to 21 carbon atoms, is linear or branched, has 0 to 4 double bonds and is optionally substituted with up to 3 hydroxyl substituents.

4. The process of claim 3, wherein the primary collector is an N-acyl derivative of sarcosine, an N-acyl derivative of glycine, or combinations thereof.

5. The process of claim 3, wherein the primary collector is an anionic surfactant selected from the group of fatty acids, alkyl benzene sulfonates, alkyl phosphates, alkyl sulfates, alkyl sulfosuccinamates, alkyl sulfosuccinates, alkyl lactylates, alkyl hydroxamates, N-acyl neutral amino acids, and mixtures thereof.

6. The process of claim 3, wherein the primary collector is an amphoteric surfactant of the following formula

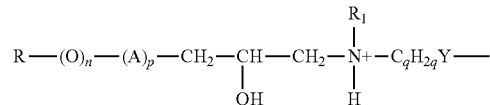

wherein R is a hydrocarbon group having from 10 to 18 carbon atoms; A is an oxyalkylene group having from 2 to 4 carbon atoms; $R_1$ is selected from the group consisting of hydrogen and hydrocarbon groups having from 1 to 4 carbon atoms; $Y^-$ is selected from the group consisting of $COO^-$ and $SO_3^-$; n is a number from 0 to 1; p is a number from 0 to 5; and q is a number from 1 to 2.

7. The process of claim 2, wherein the primary collector is an N-acyl derivative of sarcosine, an N-acyl derivative of glycine, or combinations thereof.

8. The process of claim 2, wherein the primary collector is an anionic surfactant selected from the group of fatty acids, alkyl benzene sulfonates, alkyl phosphates, alkyl sulfates, alkyl sulfosuccinamates, alkyl sulfosuccinates, alkyl lactylates, alkyl hydroxamates, N-acyl neutral amino acids, and mixtures thereof.

9. The process of claim 2, wherein the primary collector is an amphoteric surfactant of the following formula

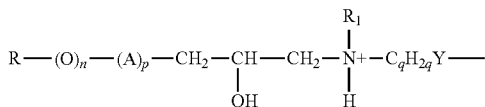

wherein R is a hydrocarbon group having from 10 to 18 carbon atoms; A is an oxyalkylene group having from 2 to 4 carbon atoms; $R_1$ is selected from the group consisting of hydrogen and hydrocarbon groups having from 1 to 4 carbon atoms; $Y^-$ is selected from the group consisting of $COO^-$ and $SO_3^-$; n is a number from 0 to 1; p is a number from 0 to 5; and q is a number from 1 to 2.

10. The process of claim 2, wherein the primary collector is an amphoteric surfactant of the following formula

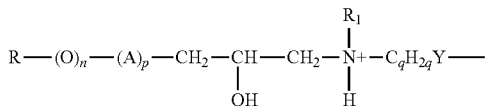

wherein R is a hydrocarbon group having from 7 to 24 carbon atoms; A is an oxyalkylene group having from 2 to 4 carbon atoms; $R_1$ is selected from the group consisting of hydrogen and hydrocarbon groups having from 1 to 4 carbon atoms; $Y^-$ is selected from the group consisting of $COO^-$ and $SO_3^-$; n is a number from 0 to 1; p is a number from 0 to 5; and q is a number from 1 to 2.

11. The process of claim 1, wherein the primary collector is an anionic surfactant selected from the group of fatty acids, alkyl benzene sulfonates, alkyl phosphates, alkyl sulfates, alkyl sulfosuccinamates, alkyl sulfosuccinates, alkyl lactylates, alkyl hydroxamates, N-acyl neutral amino acids and mixtures thereof.

12. The process of claim 1, wherein the primary collector is an amphoteric surfactant of the following formula

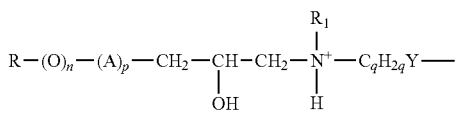

wherein R is a hydrocarbon group having from 7 to 24 carbon atoms; A is an oxyalkylene group having from 2 to 4 carbon atoms; $R_1$ is selected from the group consisting of hydrogen and hydrocarbon groups having from 1 to 4 carbon atoms; $Y^-$ is selected from the group consisting of $COO—$ and $SO_3^-—$; n is a number from 0 to 1; p is a number from 0 to about 5; and q is a number from 1 to 2.

13. The process of claim 1, wherein the collector composition comprises more than one primary collector.

14. The process of claim 1, wherein the ore is phosphate ore.

15. The process of claim 1, wherein the process is a direct flotation process.

16. A process comprising the following steps:
a) conditioning a pulped ore comprising a non-sulfidic mineral and optionally flotation bath adjuncts, in an aqueous solution;
b) adding the collector composition of claim 1 to the aqueous solution;
b) optionally adding one or more additional flotation bath adjuncts and/or one or more depressants to the pulped ore, and c) performing a froth flotation process to recover the non-sulfidic mineral.

17. The process of claim 1, wherein the primary collector is an N-acyl derivative of sarcosine, an N-acyl derivative of glycine, or combinations thereof.

18. The process of claim 1, wherein the primary collector is an amphoteric surfactant of the following formula

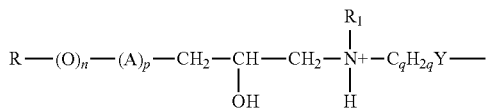

wherein R is a hydrocarbon group having from 10 to 18 carbon atoms; A is an oxyalkylene group having from 2 to 4 carbon atoms; $R_1$ is selected from the group consisting of hydrogen and hydrocarbon groups having from 1 to 4 carbon atoms; $Y^-$ is selected from the group consisting of $COO^-$ and $SO_3^-$; n is a number from 0 to 1; p is a number from 0 to 5; and q is a number from 1 to 2.

19. The process of claim 1, wherein, the collector composition comprises more than one primary collector, one of the one or more primary collectors comprising an amphoteric surfactant of the following formula

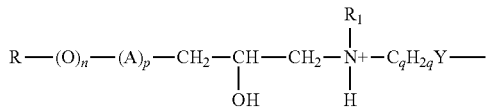

wherein R is a hydrocarbon group having from 8 to 18 carbon atoms; A is an oxyalkylene group having from 2 to 4 carbon atoms; $R_1$ is selected from the group consisting of hydrogen and hydrocarbon groups having from 1 to 4 carbon atoms; $Y^-$ is selected from the group consisting of $COO^-$ and $SO_3^-$; n is a number from 0 to 1; p is a number from 0 to 5; and q is a number from 1 to 2; and
an anionic surfactant selected from the group of fatty acids, alkyl benzene sulfonates, alkyl phosphates, alkyl sulfates, alkyl sulfosuccinamates, alkyl sulfosuccinates, alkyl lactylates, alkyl hydroxamates, N-acyl neutral amino acids, and mixtures thereof;
the ethoxylated fatty acid is of the formula $$R—C(O)—O-(EO)n \qquad (I),$$

wherein R is a hydrocarbyl group having 11 to 21 carbon atoms, is linear or branched, has 0 to 4 double bonds and is optionally substituted with up to 3 hydroxyl substituents; EO is an ethyleneoxy unit; and n is a number greater than 0.5 and less than 2;
the ore is apatite ore; and
the process is a direct flotation process.

20. A pulp comprising crushed and ground non-sulfidic ore, and a collector composition comprising from 3 to 60 wt % of a secondary collector and from 40 to 97 wt % of a primary collector, the wt % being based on a total weight of the primary and secondary collectors, wherein the primary collector is selected from the group of amphoteric and anionic surface-active compounds and the secondary collector is an ethoxylated fatty acid having an average degree of ethoxylation of greater than 0 and less than 2.

* * * * *